United States Patent
Burd

(10) Patent No.: US 8,861,114 B1
(45) Date of Patent: *Oct. 14, 2014

(54) METHOD AND SYSTEM FOR COMPENSATING FOR ADJACENT TRACKS DURING READING OF DATA

(71) Applicant: Marvell International Ltd., Hamilton (BM)

(72) Inventor: Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/133,991

(22) Filed: Dec. 19, 2013

Related U.S. Application Data

(63) Continuation of application No. 13/082,018, filed on Apr. 7, 2011, now Pat. No. 8,638,513.

(60) Provisional application No. 61/322,253, filed on Apr. 8, 2010.

(51) Int. Cl.
*G11B 5/09* (2006.01)
*G11B 27/36* (2006.01)

(52) U.S. Cl.
CPC .................................... *G11B 27/36* (2013.01)
USPC ............................................. 360/45; 360/51

(58) Field of Classification Search
None
See application file for complete search history.

(56) References Cited

U.S. PATENT DOCUMENTS

| | | | |
|---|---|---|---|
| 6,185,063 B1 | 2/2001 | Cameron | |
| 6,442,705 B1 | 8/2002 | Lamberts | |
| 6,549,362 B1 | 4/2003 | Melrose et al. | |
| 6,697,209 B2 | 2/2004 | Hughes et al. | |
| 6,724,702 B2 | 4/2004 | Taguchi et al. | |
| 6,862,155 B2 | 3/2005 | Yang et al. | |
| 6,963,528 B2 | 11/2005 | Ogura | |
| 7,082,007 B2 | 7/2006 | Liu et al. | |
| 7,126,890 B2 | 10/2006 | Learned et al. | |
| 7,209,305 B2 | 4/2007 | Chan et al. | |
| 7,218,665 B2 | 5/2007 | McElwain | |
| 7,423,828 B2 | 9/2008 | Emo et al. | |
| 7,457,075 B2 | 11/2008 | Liu et al. | |
| 7,567,397 B2 | 7/2009 | Lu | |
| 7,768,729 B2 | 8/2010 | Moser et al. | |
| 7,965,465 B2 | 6/2011 | Sanvido et al. | |
| 8,014,097 B1 | 9/2011 | Sanvido | |
| 8,125,723 B1 | 2/2012 | Nichols et al. | |
| 8,139,301 B1 | 3/2012 | Li et al. | |
| 8,259,409 B2 | 9/2012 | Braganca et al. | |
| 8,300,339 B1 | 10/2012 | Nangare et al. | |
| 8,441,750 B1 | 5/2013 | Nangare et al. | |
| 8,638,513 B1 | 1/2014 | Burd | |
| 8,638,522 B2 | 1/2014 | Matsuo et al. | |
| 2003/0218955 A1 | 11/2003 | Isshiki et al. | |
| 2007/0074083 A1 | 3/2007 | Olds et al. | |
| 2007/0177292 A1 | 8/2007 | Bui et al. | |
| 2008/0151704 A1 | 6/2008 | Harada | |
| 2008/0174905 A1 | 7/2008 | Ueda | |
| 2011/0209026 A1 | 8/2011 | Xia et al. | |

*Primary Examiner* — Daniell L Negron

(57) ABSTRACT

A method for reading a current track of data from a storage device includes using a first read head to read the current track of data and at least a first portion of at least one adjacent track of data, using at least a second read head to read at least a portion of the current track of data and at least a second portion of the at least one adjacent track of data, and decoding the data read from the current track, including processing signals from the first read head and the at least a second read head, to at least partly remove, from the signal from the first read head, contributions from the first portion of the at least one adjacent track of data. The decoding may include deriving expressions relating contributions from the current and adjacent tracks, and solving the expressions using least-mean-square analysis.

21 Claims, 3 Drawing Sheets

METHOD AND SYSTEM FOR COMPENSATING FOR ADJACENT TRACKS DURING READING OF DATA

CROSS REFERENCE TO RELATED APPLICATION

This is a continuation of commonly-assigned U.S. patent application Ser. No. 13/082,018, filed Apr. 7, 2011, now U.S. Pat. No. 8,638,513, which claims the benefit of commonly-assigned U.S. Provisional Patent Application No. 61/322,253, filed Apr. 8, 2010 and therewith, each of which is hereby incorporated by reference herein in its respective entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

This disclosure relates to a method and system for reading data that has been recorded in an arrangement of tracks on a storage medium and is read by a read head that moves relative to the surface of the storage medium. More particularly, this disclosure relates to compensating, during a read operation, for contributions to the read signal from an adjacent track or tracks.

In magnetic recording, as one example of a type of recording in which reading and writing are performed by a head that moves relative to the surface of the storage medium, data may be written in circular tracks on a magnetic disk. In known magnetic recording systems, track pitch is limited by the write head width. The read head is designed to be narrower than the write head so that reading can occur without picking up signals from any adjacent track. In addition, guard bands—empty bands on either side of each track—are provided to help prevent cases where data on one track are overwritten during writing of an adjacent track because of write head positioning errors.

In order to increase recording densities, it is desirable to shrink the track pitch and reduce or remove the guard bands between the tracks, which allows more tracks to fit on the recording medium. For example, in "Shingle Write Recording," the tracks are written so that one track partially overlaps the previous track. In such a system, track pitch theoretically may be arbitrarily small. In practice, in a Shingle Write Recording system, the track pitch is limited by the read head width. If track pitch is narrower than the read head width, then the read head may pick up a significant amount of signals from one or more adjacent tracks, leading to low data reliability.

In order to further reduce the track pitch beyond the read head width, it is necessary to mitigate the interference picked up from adjacent tracks during a read operation. If the component of the adjacent track picked up by the read head is sufficiently small, it may be possible to use knowledge of the data written on the adjacent track to carry out ITI cancellation.

Copending, commonly-assigned U.S. patent application Ser. No. 12/882,802, filed Sep. 15, 2010 and hereby incorporated by reference herein in its entirety, describes a method and system for compensating for ITI by using actual or estimated data from the adjacent track.

SUMMARY

An embodiment of a method for reading a current track of data from a storage device includes using a first read head to read the current track of data and at least a first portion of at least one adjacent track of data, using at least a second read head to read at least a portion of the current track of data and at least a second portion of the at least one adjacent track of data, and decoding the data read from the current track, including processing signals from the first read head and the at least a second read head, to at least partly remove, from the signal from the first read head, contributions from the first portion of the at least one adjacent track of data.

In another embodiment of such a method, the at least one adjacent track of data includes a number of adjacent tracks of data greater than one, and the at least a second read head comprises a number of read heads equal to the number of adjacent tracks of data.

In yet another embodiment of such a method, the at least one adjacent track of data includes only one adjacent track of data, the at least a second read head comprises only one second read head.

In some embodiments of such a method, the using a first read head comprises using a first read head to read the current track of data and at least a first portion of each of at least one adjacent track of data, the using at least a second read head comprises using at least a second read head to read at least a portion of the current track of data and at least a second portion of each of the at least one adjacent track of data, and the decoding comprises decoding the data read from the current track, including processing signals from the first read head and each of the at least a second read head, to at least partly remove, from the signal from the first read head, contributions from the first portion of each of the at least one adjacent track of data.

In some embodiments of such a method, the decoding includes deriving, from the signals from the read heads, expressions relating contributions from the current track and contributions from the adjacent tracks and solving the expressions using least-mean-square analysis to obtain data from the current track.

An embodiment of a storage device includes a storage medium having a plurality of tracks of data thereon, and a read data channel. The read data channel includes a first read head to read a current track of data and at least a first portion of each of at least one adjacent track of data, a second read head to read at least a portion of the current track of data and at least a second portion of each of the at least one adjacent track of data, and a decoder that processes signals from the first read head and each of the at least a second read head, to factor out at least partly remove, from the signal from the first read head, contributions from the first portion of each of the at least one adjacent track of data.

In another embodiment of such a storage device, the at least one adjacent track of data includes a number of adjacent tracks of data greater than one, and the at least a second read head comprises a number of read heads equal to the number of adjacent tracks of data.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

This disclosure is a method and system for factoring out adjacent-track signals from a data storage read-back signal to recover a clear main-track data signal, particularly where the adjacent track signals result from ITI in a case of Shingle Write Recording, Two-Dimensional Magnetic Recording (TDMR) or other small-track-pitch recording techniques.

Figure 1:
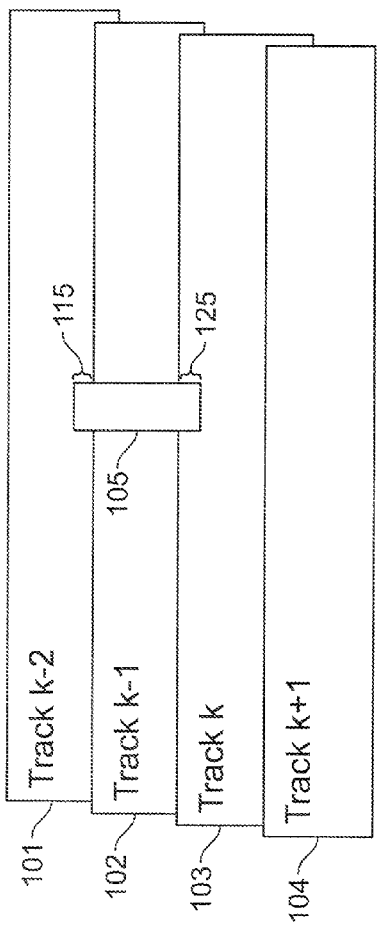
FIG. 1 is a simplified schematic view of four shingled data tracks with a read head, with which the disclosure may be used.
Figure 2:
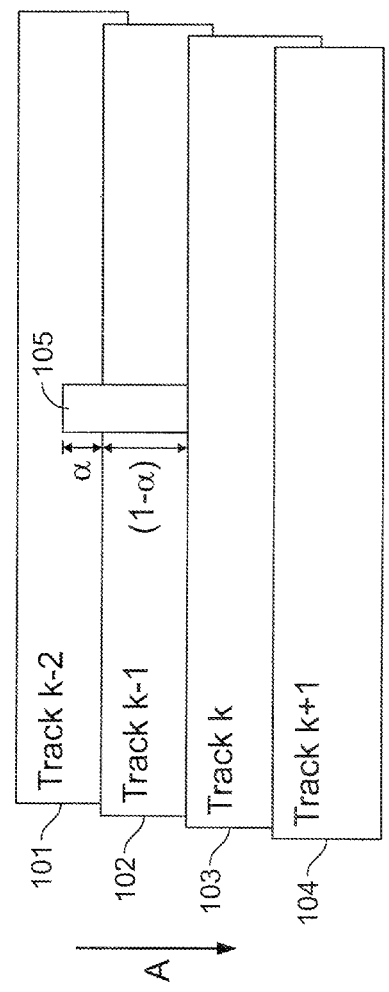
FIG. 2 is a view similar to FIG. 1 in which the read head is positioned to read contributions from a track of interest and only one additional track.

FIG. 1 shows a simplified schematic view of four shingled data tracks 101, 102, 103, 104, with a read-head 105 wider than the track pitch. Track 101 is written first, followed by track 102, 103, etc. Because the tracks are written in a shingled manner—e.g., track 102 partially overwrites information written on track 101. Track pitch is now limited by the size of read head 105—if the read head width is wider than the track pitch, read head 105 will pick up significant signal components from one or more adjacent tracks 101, 103 as indicated at 115 and 125, making it more difficult to demodulate data from the current track 102. As shown in FIG. 2, one possible way to deal with ITI is to use decisions from adjacent track to cancel ITI in the current track, by positioning read head 105 so that substantially all contributions to ITI come from a single track adjacent to the track of interest, as opposed two adjacent tracks as in FIG. 1.

Assuming that the tracks are read in the same order 101, 102, 103, 104, etc., in which they were written, as indicated by arrow A, then during the reading and decoding of track k (103), the hard disk controller may provide a read-back signal corresponding to the data on track k−1 (102), which has been read previously. The read-back information may used to cancel the ITI contribution to track k (103) from track k−1 (102).

Figure 3:
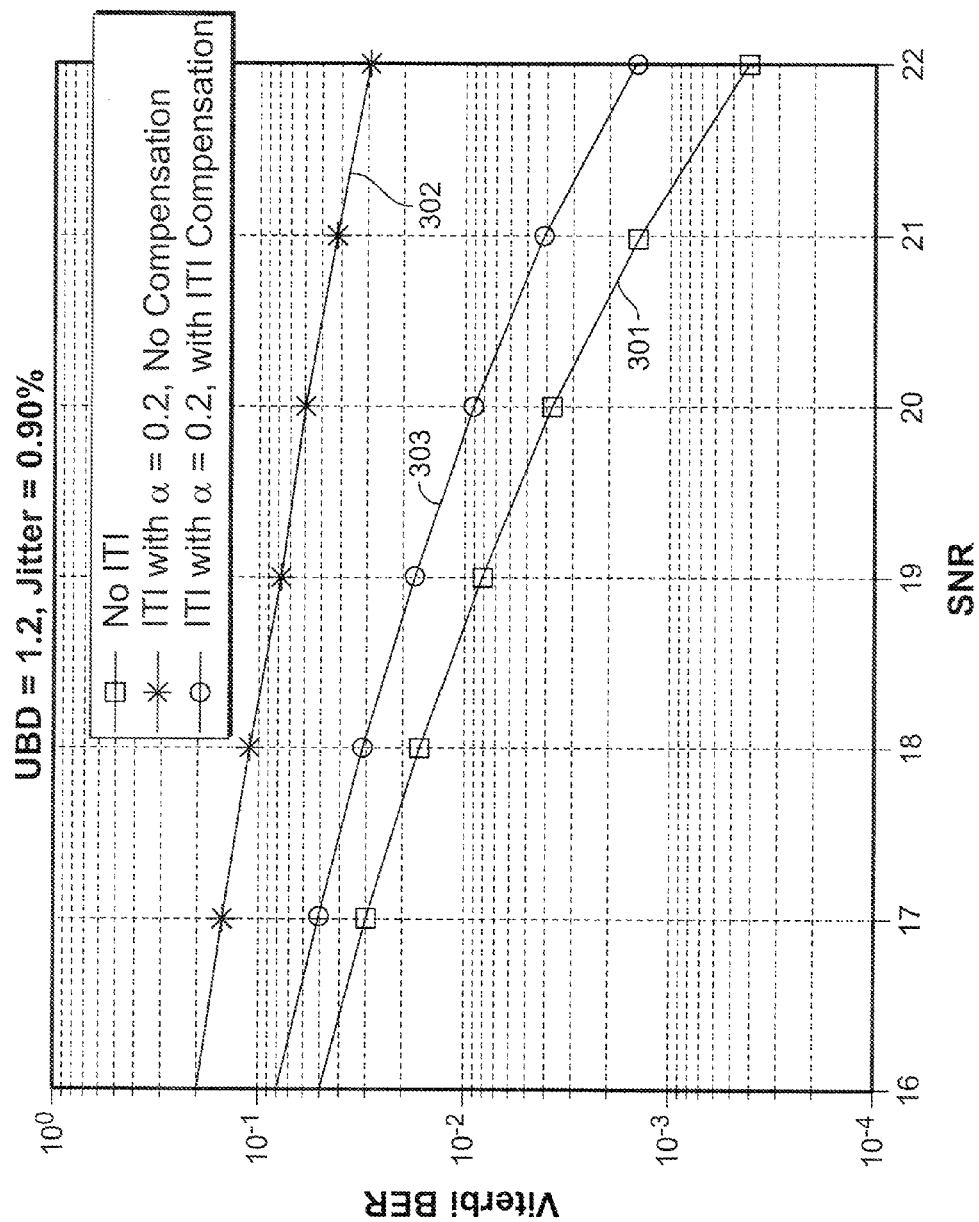
FIG. 3 is a graphical representation of the effects of ITI and ITI compensation on a signal.

The presence of even 10% ITI from an adjacent track, can lead to a significant performance degradation, unless ITI cancellation is applied. Curve 301 in FIG. 3 shows the bit error rate in a decoded signal as a function of signal-to-noise ratio in the absence of ITI, while curve 302 shows the same signal with uncompensated ITI, where, in FIG. 2, α=0.2 (i.e., in FIG. 2 20% of the signal picked up by read-head 105 comes from adjacent track k−1 (102)). Curve 303, which shows the same signal with ITI compensation according to an embodiment of the disclosure, is much closer to curve 301 than to curve 302 as most of the ITI has been removed.

Such a correction technique, one example of which is described in above-incorporated application Ser. No. 12/882, 802, may involve pre-reading of the adjacent track and storage of the decoder decisions, which may require, in some implementations, a buffer large enough to hold a complete additional track's worth of data. This also may result, in some implementations, in a substantial reduction in read throughput in the case of a random data access mode—e.g., if the tracks are not read in order, then to read each track, an adjacent track must be read first, resulting in a 50% throughput reduction.

Figure 4:
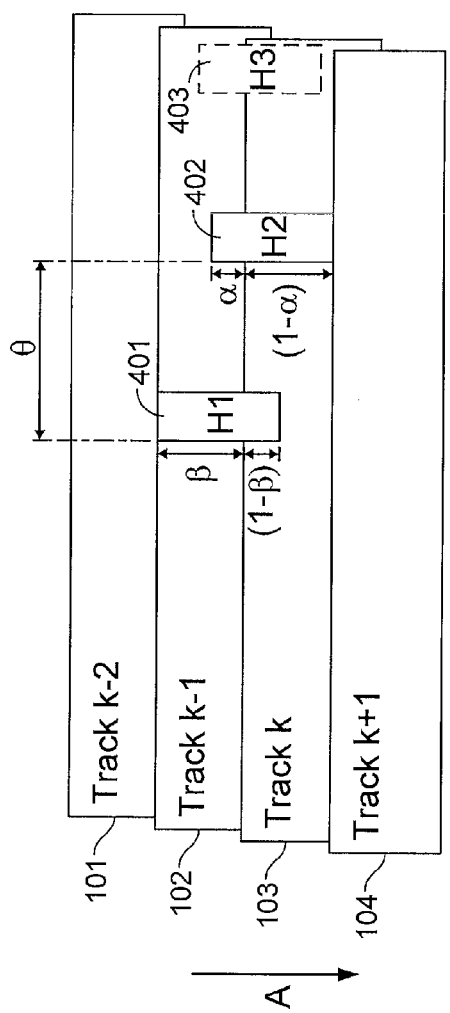
FIG. 4 shows an arrangement of read heads in accordance with an embodiment of the disclosure.

FIG. 4 shows an arrangement according to an embodiment of the present disclosure in which an array of two or more read heads is used to read the data. In the arrangement of FIG. 4, there are two read heads H1, H2 (401, 402), but the disclosure may be generalized to any number of read heads greater than or equal to two. In general, as the track pitch decreases relative to the size of the read head, so that the number of tracks spanned by each read head increases, the number of read heads used can be expected to increase accordingly. For example, optional third additional read head H3 (403) is shown in phantom.

If the direction of storage medium movement is indicated by arrow B in FIG. 4, then a particular location on the track medium will be read first by head H2 (402) and then sometime later will reach read head H1 (401). If $y^{(1)}$ and $y^{(2)}$ are the signal components from the track of interest k−1 (102) and the adjacent track k (103), respectively, then the signal $Y^{(2)}$ picked up by the head H2 (402) can be written as:

$$Y^{(2)} = \alpha y^{(1)} + (1-\alpha) y^{(2)}$$

and the signal $Y^{(1)}$ picked up by the second head can be written as:

$$Y^{(1)} = \beta y^{(1)} + (1-\beta) y^{(2)}.$$

The objective is to solve for the signal component $y^{(1)}$ representing the track of interest k−1 (102). Using linear algebraic notation, the foregoing two equations may be written:

$$\begin{bmatrix} Y^{(2)} \\ Y^{(1)} \end{bmatrix} = \begin{bmatrix} \alpha & 1-\alpha \\ \beta & 1-\beta \end{bmatrix} \begin{bmatrix} y^{(1)} \\ y^{(2)} \end{bmatrix}$$

Solving for $y^{(1)}$, $y^{(2)}$ yields:

$$\begin{bmatrix} y^{(1)} \\ y^{(2)} \end{bmatrix} = \begin{bmatrix} \alpha & 1-\alpha \\ \beta & 1-\beta \end{bmatrix}^{-1} \begin{bmatrix} Y^{(2)} \\ Y^{(1)} \end{bmatrix} = \frac{1}{\alpha(1-\beta) - (1-\alpha)} \begin{bmatrix} \alpha & -\beta \\ \alpha-1 & 1-\beta \end{bmatrix} \begin{bmatrix} Y^{(2)} \\ Y^{(1)} \end{bmatrix}$$

$$= \frac{1}{\alpha - \beta} \begin{bmatrix} \alpha & -\beta \\ \alpha-1 & 1-\beta \end{bmatrix} \begin{bmatrix} Y^{(2)} \\ Y^{(1)} \end{bmatrix}$$

For demodulating $y^{(1)}$, this would suggest an ITI cancellation filter of the form:

$$F_{ITI} = \frac{1}{\alpha - \beta} [\alpha, -\beta].$$

This is known as a Zero-Forcing (ZF) solution for the ITI filter taps, because it does not take noise into account. A ZF solution for ITI suffers from noise boosting, and does not provide good performance. A better solution would be a least-mean-square solution as described below.

The foregoing example illustrates the case where each read head overlaps two tracks—one track of interest and one adjacent track that contributes ITI. Such a system can be solved using two equations in two unknowns as shown above. It will further be appreciated that by using additional heads, systems of multiple equations in multiple unknowns may be solved. Thus, as track widths become narrower, and each read head covers multiple tracks, the number of heads can be increased.

Moreover, if two-dimensional encoding/decoding is used over multiple tracks, a multiple-head embodiment of the present disclosure can be used.

Figure 5:
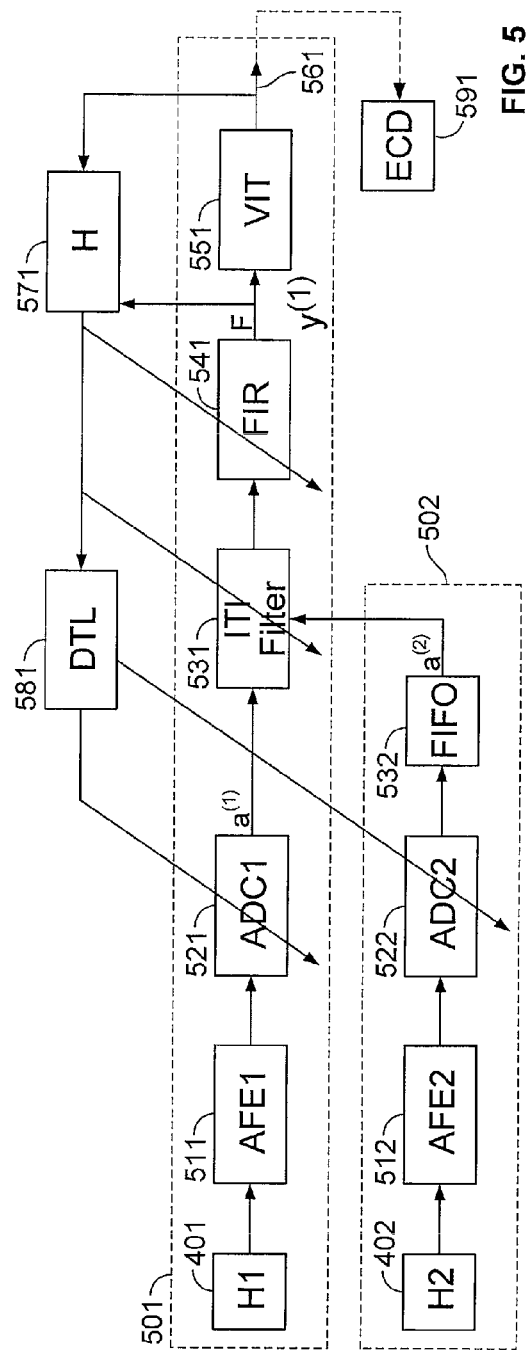
FIG. 5 is a schematic view of a decoder architecture in accordance with an embodiment of the disclosure.

FIG. 5 schematically shows the architecture of the decoder channels 501, 502 for the two read heads H1, H2 (401, 402). Each channel 501, 502 may have its own respective analog front end (AFE) 511, 512 and analog-to-digital converter (ADC) 521, 522. In the system shown in FIG. 4, it is assumed that the track that is being decoded is track k−1, i.e., the track contributing most of the signal to picked up by read head H1 (401), while read head H2 (402) primarily picks up information from adjacent, interfering track k. Therefore, downstream of analog-to-digital converter 522, channel 502 has a FIFO delay line 532 whose purpose will be discussed below, which feeds ITI cancellation filter 531 that operates on the signal from analog-to-digital converter 512 in according with the filtering technique discussed above. The output of read head H2 (402) is not further processed in this embodiment.

The output of ITI filter 531 is filtered, e.g. by FIR filter 541 and then provided as an input to Viterbi detector (VIT) 551. Depending on the channel architecture, Viterbi detector decisions can be sent to an Error Correction Decoder Module (ECD) 591, or can be sent along with FIR samples to some other block, such as a data-dependent Viterbi detector. Additionally, Viterbi decisions can be provided to channel reconstructive filter (H) 571. Reconstructed noiseless channel samples are then used to drive digital timing loop (DTL) 581 to provide timing signals for the two analog-to-digital converters 521, 522 and to adapt ITI and FIR filters 531, 541. Note that timing for the signal coming from the second read head (H2) 402 is determined (synchronized) by minimizing the noise in the signal $y^{(1)}$ representative of the data written on track k−1, rather than by the data on adjacent track $y^{(2)}$, which is the primary component read by read head (H2) 402, although for track 502 this may be adjusted as described below. Because we are only interested in demodulating track k−1 (102) as opposed to track k (103), the analog-to-digital converter should be driven to choose sampling points minimizing the noise in signal $y^{(1)}$. On the other hand, the signal picked up by read head (H2) 402 should be sampled at the same signal points as sampled by read head (H1) 401 to be able to cancel contribution of the adjacent track k from the signal $Y^{(1)}$ picked up by read head (H1) 401. Therefore the timing for read head H2 (402) is driven by the timing recovery based on ITI-compensated FIR samples corresponding to track k−1 (103).

A zero-forcing solution such as that described above may suffer from noise boosting, leading to suboptimal performance. A better adaptation method for ITI filter taps may be based on minimizing squared error:

$$\min_{(I_0, I_1)} [(I_0 a^{(1)} + I_1 a^{(2)}) F - \bar{y}^{(1)}]^2$$

leading to:

$$I_0(k) = I_0(k-1) - \mu_0 e(a^{(1)} F)$$

$$I_1(k) = I_1(m-1) + \mu_1 e(a^{(2)} F)$$

where $$e = (I_0 a^{(1)} + I_1 a^{(2)}) F - \bar{y}^{(1)}$$

and $\mu_0$ and $\mu_1$ are damping constants and may be the same or different.

Remembering that the movement of the storage medium is indicated by arrow B in FIG. 4, that means that any particular portion of the storage medium will be read by read head H2 (402) before it is read by read head H1 (401). That means that there will be a phase offset θ between the signals from read heads H1, H2 (401, 402). This phase offset can be broken down into an integer portion $\theta_I$ and a fractional portion $\theta_R$.

The integer portion $\theta_I$ of the phase offset can be accounted for by FIFO delay line 532. The fractional portion $\theta_R$ of the phase offset may be used to delay sampling by analog-to-digital converter 522 from the timing indicated by digital timing loop filter 581. The value of θ can change from one track from another, and is calibrated during manufacturing. After calibration ADC2 522 will be set up to sample a phase offset $\theta_R$ with respect to ADC1 521. Digital timing loop filter 581, can provide some fine adjustment to this setting.

It should be noted that the foregoing techniques operate during tracking mode. However, because read head (H2) 402 flies ahead of read head (H1) 401, other techniques, such as digital interpolation of the signal picked up by read head (H2) 402 may be needed during acquisition mode to assure proper sampling of the signal picked up by read head (H2) 402.

Thus it is seen that a data storage system, and method of decoding stored data, in which contributions from one or more adjacent tracks may be accounted for in decoding one or more tracks of interest, has been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for reading a current track of data from a storage device, the method comprising:
   using a first read head to read the current track of data and at least a respective first portion of each of a plurality of adjacent tracks of data;
   using a plurality of respective additional read heads, respectively offset along the current track of data, and offset perpendicularly to the current track of data, relative to the first read head, to read at least a portion of the current track of data and at least a respective second portion of each of the plurality of adjacent tracks of data, and adjusting the at least a portion of the current track of data and the at least a respective second portion of the plurality of adjacent tracks of data read by the plurality of respective additional read heads to account for each respective offset; and
   decoding the data read from the current track, including processing signals from the first read head and the plurality of respective additional read heads, to at least partly remove, from the signal from the first read head, contributions from the respective first portion of each of the plurality of adjacent tracks of data.

2. The method of claim 1 wherein the decoding comprises:
   deriving, from signals from the first read head, a first expression relating contributions from the current track and contributions from each of the plurality of adjacent tracks;
   deriving, from the signals from each respective one of the additional read heads, a respective additional expression relating contributions from the current track and contributions from the plurality of adjacent tracks; and
   solving the first expression and the respective additional expressions to obtain data from the current track.

3. The method of claim 2 wherein:
the using a first read head comprises positioning the first read head to read data from the current track and less than all of each of the plurality of adjacent tracks; and
the using a plurality of respective additional read heads comprises positioning each respective one of the plurality of respective additional read heads to read data from a respective one of the plurality of adjacent tracks and less than all of the current track and of each other one of the plurality of adjacent tracks.

4. The method of claim 3 wherein the positioning each respective one of the plurality of respective additional read heads comprises positioning the respective one of the plurality of respective additional read heads to read data from substantially all of a respective one of the plurality of adjacent tracks and less than all of the current track and of each other one of the plurality of adjacent tracks.

5. The method of claim 2 wherein the decoding comprises deriving, from the signals from the first read head and the plurality of respective additional read heads, expressions relating contributions from the current track and contributions from the adjacent tracks.

6. The method of claim 5 wherein the solving comprises solving the expressions using least-mean-square analysis to obtain data from the current track.

7. An integrated circuit that receives signals from a first read head that reads a current track of data and at least a first portion of each of a plurality of adjacent tracks of data, and from a plurality of additional read heads that are respectively offset along the current track of data, and offset perpendicularly to the current track of data, relative to the first read head, that read at least a portion of the current track of data and at least a second portion of each of the plurality of adjacent tracks of data; the integrated circuit comprising:
a decoder that processes signals from the first read head and the plurality of additional read heads, including adjusting the at least a portion of the current track of data and the at least a second portion of each of the plurality of adjacent tracks of data read by the plurality of additional read heads to account for the offsets, to at least partly remove, from the signal from the first read head, contributions from the first portion of each of the plurality of adjacent tracks of data; wherein the decoder comprises:
a first channel for the first read head;
a respective additional channel for each additional read head;
an inter-track interference filter having as inputs an output of the first channel and outputs of the additional channels, and having as an output a signal representing the current track from which interference from the adjacent tracks has been filtered; and
a feedback loop that derives, from the output, timing signals for the first channel and the additional channels.

8. The integrated circuit of claim 7 wherein:
each of the additional channels comprises a respective delay to perform the adjusting by accounting for phase difference between the first channel and each additional second channel resulting from the offset.

9. A method for reading a current track of data from a storage device, the method comprising:
using a first read head to read the current track of data and at least a first portion of at least one adjacent track of data;
using at least a second read head, respectively offset along the current track of data, and offset perpendicularly to the current track of data, relative to the first read head, to read at least a portion of the current track of data and at least a second portion of the at least one adjacent track of data, and adjusting the at least a portion of the current track of data and the at least a second portion of the at least one adjacent track of data read by the second read head to account for the offset, the adjusting comprising using phase difference between the first read head and the second read head resulting from the offset to control sampling by the second read head; and
decoding the data read from the current track, including processing signals from the first read head and the at least a second read head, to at least partly remove, from the signal from the first read head, contributions from the first portion of the at least one adjacent track of data.

10. The method of claim 9 further comprising determining the phase difference at time of manufacture of the storage device.

11. The method of claim 9 wherein using the phase difference further comprises compensating for at least a portion of the phase difference by delaying output of the second read head.

12. The method of claim 9 wherein the decoding comprises:
deriving, from signals from the first and second read heads, a first expression relating contributions from the current track and contributions from the one adjacent track.

13. The method of claim 12 wherein the decoding further comprises:
deriving, from the signal from the one second read head, a second expression relating contributions from the current track and contributions from the one adjacent track; and
solving the first expression and the second expression to obtain data from the current track.

14. The method of claim 9 wherein:
the using a first read head comprises using a first read head to read the current track of data and at least a first portion of each of at least one adjacent track of data;
the using at least a second read head comprises using at least a second read head to read at least a portion of the current track of data and at least a second portion of each of the at least one adjacent track of data; and
the decoding comprises decoding the data read from the current track, including processing signals from the first read head and each of the at least a second read head, to at least partly remove, from the signal from the first read head, contributions from the first portion of each of the at least one adjacent track of data.

15. The method of claim 14 further comprising deriving timing for the first read head and the at least a second read head from data that has been decoded from the current track to at least partially remove contributions from each of the at least one adjacent track of data.

16. The method of claim 9 wherein the adjusting timing using phase difference comprises adjusting timing for each of the at least a second read head based on respective phase difference between the first read head and each of the at least a second read head resulting from the respective offset.

17. A integrated circuit that receives signals from a first read head that reads a current track of data and at least a first portion of at least one adjacent track of data, and from at least a second read head, respectively offset along the current track of data, and offset perpendicularly to the current track of data, relative to the first read head, to read at least a portion of the current track of data and at least a second portion of the at least one adjacent track of data; the integrated circuit comprising:
reading circuitry that:

uses phase difference between the first read head and the second read head to account for the offset to control sampling by the second read, and decodes the data read from the current track, including processing signals from the first read head and the at least a second read head, to at least partly remove, from the signal from the first read head, contributions from the first portion of the at least one adjacent track of data; wherein the reading circuitry comprises:

a delay line to account for a first portion of the phase difference; and digital timing circuitry to account for a second portion of the phase difference.

18. The integrated circuit of claim 17 wherein the digital timing circuitry controls sampling by the first and second read heads.

19. The integrated circuit of claim 17 wherein the reading circuitry decodes the data read from the current track by deriving a first expression relating contributions from the current track and contributions from the one adjacent track.

20. The integrated circuit of claim 19 wherein the reading circuitry further:

derives, from the signal from the one second read head, a second expression relating contributions from the current track and contributions from the one adjacent track; and solves the first expression and the second expression to obtain data from the current track.

21. The integrated circuit of claim 17 wherein the reading circuitry:

uses the first read head to read the current track of data and at least a first portion of each of at least one adjacent track of data;

uses at least a second read head to read at least a portion of the current track of data and at least a second portion of each of the at least one adjacent track of data; and decodes the data read from the current track, including processing signals from the first read head and each of the at least a second read head, to at least partly remove, from the signal from the first read head, contributions from the first portion of each of the at least one adjacent track of data.

\* \* \* \* \*